United States Patent [19]

Sharma et al.

[11] Patent Number: 5,520,895
[45] Date of Patent: May 28, 1996

[54] METHOD FOR THE REDUCTION OF NITROGEN OXIDES USING IRON IMPREGNATED ZEOLITES

[75] Inventors: Sanjay B. Sharma, Langhorne, Pa.; David S. Shihabi, Pennington, N.J.

[73] Assignee: Mobil Oil Corporation, Fairfax, Va.

[21] Appl. No.: 271,693

[22] Filed: Jul. 7, 1994

[51] Int. Cl.$^6$ .................................................. C01B 21/00
[52] U.S. Cl. ................................ 423/239.2; 423/239.1
[58] Field of Search .......................... 423/239.2, 239.1; 502/66, 68, 71, 85

[56] References Cited

U.S. PATENT DOCUMENTS

| | | | |
|---|---|---|---|
| 4,631,267 | 3/1985 | Lachman et al. | 502/439 |
| 4,778,665 | 10/1988 | Krishnamurthy et al. | 423/239 |
| 4,867,954 | 9/1989 | Staniulis et al. | 423/239 |
| 4,961,917 | 10/1990 | Byrne | 423/239 |
| 4,973,399 | 11/1990 | Green et al. | 208/120 |
| 5,024,981 | 6/1991 | Speronello et al. | 502/67 |
| 5,173,278 | 12/1992 | Marler et al. | 423/239 |
| 5,254,322 | 10/1993 | Bhore et al. | 423/239.2 |
| 5,271,913 | 12/1993 | Iida et al. | 423/213.2 |
| 5,310,714 | 5/1994 | Grasseli et al. | 502/64 |

*Primary Examiner*—Michael Lewis
*Assistant Examiner*—Thomas G. Dunn, Jr.
*Attorney, Agent, or Firm*—Ronald A. Bleeker; Malcolm D. Keen; Gerald L. Harris

[57] ABSTRACT

There is provided a process for the treatment of exhaust gas, which process uses a specially prepared catalyst composition, for the selective catalytic reduction of $NO_x$ contained in the exhaust gas. An embodiment of the process of this invention comprises a catalytic stage to selectively catalytically reduce $NO_x$ over a catalyst composition comprising an intermediate pore size zeolite catalyst that has been treated with a water soluble iron salt or salt precursor in a way effective to maximize iron dispersion. The intermediate pore size zeolite of this invention preferably has a silica:alumina molar ratio of between about 20 and about 1000. The catalyst of this invention typically comprises a silica, titania, or zirconia binder, preferably a binder including a high molecular weight, hydroxyl functional silicone resin. The catalyst of this invention is preferably formed, e.g., extruded, and then simultaneously calcined and hydrothermally treated.

20 Claims, No Drawings

METHOD FOR THE REDUCTION OF NITROGEN OXIDES USING IRON IMPREGNATED ZEOLITES

FIELD OF THE INVENTION

This invention is concerned with the abatement of nitrogen oxides and, optionally, other undesirable compounds, in industrial and engine exhaust gases. In particular, it is concerned with a catalytic method for efficiently eliminating these undesirable compounds before discharge to the atmosphere. It is more particularly concerned with the use of a specially prepared catalyst comprising an intermediate pore size zeolite that has been contacted with a water soluble iron salt or salt precursor for the selective catalytic reduction of the $NO_x$ present in the exhaust gas.

BACKGROUND OF THE INVENTION

Although several nitrogen oxides are known which are relatively stable at ambient conditions, it is generally recognized that two of these, viz. nitric oxide (NO) and nitrogen dioxide ($NO_2$), are the principal contributors to smog and other undesirable environmental effects when they are discharged into the atmosphere. These effects will not be discussed further here since they are well recognized and have led various government authorities to restrict industrial emissions in an attempt to limit the level of the oxides in the atmosphere. Nitric oxide and nitrogen dioxide, under appropriate conditions, are interconvertible according to the equation.

$$2\ NO + O_2 \rightleftharpoons 2\ NO_2$$

For purposes of the present invention, $NO_x$ will be used herein to represent nitric oxide, nitrogen dioxide, and nitrous oxide, as well as mixtures containing these gases.

Formation of man-made nitrogen oxides from the elements occurs in the high temperature zones of combustion processes. The internal combustion engine, and coal or gas-fired or oil-fired furnaces, boilers and incinerators, all contribute to $NO_x$ emissions. In general, fuel-rich combustion mixtures produce exhaust gases with lower contents of $NO_x$ than do lean mixtures. Although the concentrations of $NO_x$ in the exhaust gases produced by combustion usually are low, the aggregate amount discharged in industrial and/or highly populated areas tends to cause problems. Other industrial sources of $NO_x$ also exist. These are associated with the manufacture of nitric acid, with nitration of organic chemicals, and with other chemical operations such as the reprocessing of spent nuclear fuel rods by dissolution in nitric acid to recover uranyl nitrate followed by calcination to convert the nitrate to uranium oxide. In these instances the waste gases may contain relatively high levels of $NO_x$, approaching 3%.

The so-called "stable" nitrogen oxides have in common the somewhat peculiar property that although they are thermodynamically unstable with respect to decomposition into elemental oxygen and nitrogen, no simple, economical method has been described for inducing this decomposition. It has been discovered, however, that the addition of a reductant such as ammonia to the exhaust gas, under appropriate reaction conditions, converts $NO_x$ to elemental nitrogen and steam and denitrifies the exhaust gas.

The process of contacting an industrial flue gas with a catalyst in the presence of ammonia at a temperature in the range of about 200°–600° C. to denitrify the flue gas has come to be known as the process for Selective Catalytic Reduction (SCR) of $NO_x$. In order to avoid confusion, any reference made herein to "Selective Catalytic Reduction," or to "SCR," is intended to refer to a process in which a mixture of $NO_x$ and $NH_3$ are induced to react catalytically at elevated temperatures.

The term "denitrify" as used herein, means to reduce the amount of one or more noxious nitrogen compounds (such as NO, $NO_x$ and HCN) contained in a waste gas, preferably by conversion to nitrogen gas.

The use of zeolite-based catalysts for the SCR of nitrogen oxides with ammonia is well established. For example, U.S. Pat. No. 4,220,632 to Pence et al. discloses a process for reducing noxious nitrogen oxides from a fossil-fuel-fired power generation plant, or from other industrial plant off-gas streams, to elemental nitrogen and/or innocuous nitrogen oxides employing ammonia as the reductant and, as the catalyst, the hydrogen or sodium form of a zeolite having pore openings of about 3 to 10 Angstroms.

U.S. Pat. No. 5,173,278 to Marler et al. discloses an SCR process where the ammonia needed for the reduction of $NO_x$ is generated, at least in part, by hydrolysis of HCN over a supported transition metal and/or a crystalline zeolite catalyst. The process described in this patent appears to require that HCN be present.

In particular, it is known that the hydrogen form of ZSM-5 (HZSM-5) is well suited for this reaction at temperatures between about 400°–500° C. U.S. Pat. No. 4,778,665 to Krishnamurthy et al. describes an SCR process for pretreating industrial exhaust gases contaminated with $NO_x$ in which the catalyst has a silica to alumina ratio of at least about 20 and a Constraint Index of 1 to 12. The entire contents of this patent are incorporated herein by reference as if fully set forth.

At temperatures below about 400° C., HZSM-5 is significantly less efficient at removing nitrogen oxides from the gas stream.

BRIEF SUMMARY OF THE INVENTION

One embodiment of this invention is a method for treating a gas mixture comprising $NO_x$ and ammonia, said method comprising directing the gas mixture along with a source of oxygen over a catalyst under treating conditions effective for the selective catalytic reduction of $NO_x$; said catalyst comprising an intermediate pore size zeolite which has been contacted with a water soluble iron salt or salt precursor under contacting conditions effective to produce an iron loading on the zeolite component of the catalyst of at least about 0.4 wt. %; said catalyst having been composited with a binder comprising at least one selected from the group consisting of titania, zirconia, and silica; said catalyst having been calcined and hydrothermally treated.

Another embodiment of this invention is a method for treating a gas mixture comprising $NO_x$ and ammonia, said method comprising directing the gas mixture along with a source of oxygen over a catalyst composition under treating conditions effective for the selective catalytic reduction of $NO_x$; said catalyst composition having been prepared by combining into one formable mass:

(a) an intermediate pore size zeolite having a silica:alumina molar ratio of between about 20 and about 1000;

(b) a water soluble iron salt in a quantity sufficient to provide an iron loading of at least about 1.0 wt. % of the zeolite component of the catalyst composition;

(c) silicone resin;

(d) methyl cellulose; and (e) at least one carrier selected from the group consisting of methanol, ethanol, isopropyl alcohol, N-methyl pyrrolidone, dibasic ester, water and mixtures thereof; said catalyst composition further having been formed into a desired shape, said catalyst composition still further having been calcined and hydrothermally treated after being formed.

Yet another embodiment of this invention is a method of making a catalyst composition suitable for the selective catalytic reduction of $NO_x$ comprising: producing a formable mass by combining in one step (a) an intermediate pore size zeolite, said intermediate pore size zeolite having a silica:alumina ratio of between about 40 and about 500;

(b) a water soluble iron salt in a quantity sufficient to provide an iron loading of at least about 1.5 wt. % of the zeolite component of the catalyst composition;

(c) a silicone resin;

(d) a methyl cellulose; and (e) at least one suitable carrier selected from the group consisting of methanol, ethanol, isopropyl alcohol, N-methyl pyrrolidone, dibasic ester, water and mixtures thereof; extruding the formable mass into a desired shape, and then calcining and hydrothermally treating the extruded shape.

DETAILED DESCRIPTION

The term "exhaust gas" as used herein means any waste gas which is formed in an industrial process or operation and which is normally disposed of by discharge to the atmosphere, with or without additional treatment. "Exhaust gas" also includes the gas produced by internal combustion engines. The composition of such a gas varies and depends on the particular process or operation which leads to its formation. When formed in the combustion of fossil fuels, it will generally comprise nitrogen, steam and carbon dioxide in addition to low levels, such as up to about 1000 ppm, of nitric oxide plus nitrogen dioxide. Sulfur-containing fuels will typically produce an exhaust gas that contains one or more sulfur oxides, such as $SO_2$. Rich fuel-air mixtures will generally produce an exhaust gas that contains little if any free oxygen along with some carbon monoxide, hydrocarbons, and hydrogen. Lean fuel-air mixtures, i.e., mixtures in which more air is provided than is stoichiometrically required to completely burn the fuel, will form an exhaust gas that contains gaseous oxygen. The foregoing is a general description given to illustrate the variability in the composition of the exhaust gases from fossil fuel combustion. Other industrial processes such as nitration, uranium recovery, and calcining nitrate salt containing solids produce exhaust gases which can have compositions different from those noted above. They may be substantially devoid of steam, for example, and may contain very high concentrations of nitrogen or other inert gases.

The conversion of $NO_x$ to $N_2$ is believed to proceed generally according to equations (1) and (2).

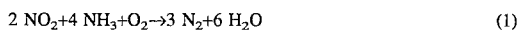

$$2\ NO_2 + 4\ NH_3 + O_2 \rightarrow 3\ N_2 + 6\ H_2O \quad (1)$$

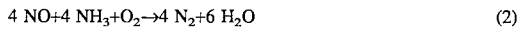

$$4\ NO + 4\ NH_3 + O_2 \rightarrow 4\ N_2 + 6\ H_2O \quad (2)$$

This invention is effective for treating exhaust gas containing the approximate stoichiometric amount of ammonia. The ammonia may be present in the gas, may be added to the gas, or may be produced by an upstream process. As used herein, the expression "approximate stoichiometric amount of ammonia" is intended to mean about 0.75 to about 1.25 times the molar amount of ammonia indicated in equations (1) and (2) when excess oxygen is present.

According to the method of this invention, any carbon monoxide and hydrocarbons present in the exhaust gas may be oxidized to carbon dioxide and water over the catalyst. Additionally, hydrocarbons may be selectively absorbed/adsorbed on the catalyst.

One embodiment of the invention is a method for treating a gas mixture comprising $NO_x$, ammonia, and, optionally, at least one of CO and a hydrocarbon and mixtures thereof, said method comprising directing the gas mixture along with a source of oxygen over a catalyst under conditions effective for the selective catalytic reduction of $NO_x$, said catalyst comprising an intermediate pore size zeolite which has had iron added under conditions effective to provide maximum iron dispersion, e.g., by contacting the zeolite with a water soluble iron salt or salt precursor, said catalyst having been hydrothermally treated at least once, and said catalyst optionally further comprising a binder.

Each of the principal features of this invention will be more fully described below.

Feeds

This invention is effective to treat industrial and engine exhaust gases to remove $NO_x$, and optionally other undesirable compounds, such as CO and hydrocarbons, if present. These exhaust gases are typically produced in internal combustion engines, and coal or gas-fired or oil-fired furnaces, boilers and incinerators, and by the manufacture of nitric acid, by the nitration of organic chemicals, and by other chemical operations such as the reprocessing of spent nuclear fuel rods by dissolution in nitric acid to recover uranyl nitrate followed by calcination to convert the nitrate to uranium oxide.

Process Conditions

The exhaust gas is typically treated in the catalytic system of this invention at a temperature of about 200° C. to about 1,000° C. or more, e.g., within the range of about 225° C. to about 900° C., e.g., of about 225° C. to about 750° C., e.g., of about 250° C. to about 600° C. and at a gas hourly space velocity, GHSV, (vols. of gas at STP per volume of catalyst per hour) adjusted to provide the desired conversion. The GHSV can be from about 1,000 to about 500,000 $hr^{-1}$, e.g., within the range of about 2,500 to about 250,000 $hr^{-1}$, e.g., from about 5,000 to about 150,000 $hr^{-1}$, e.g., from about 10,000 to about 100,000 $hr^{-1}$. The process of this invention is operable at subatmospheric to superatmospheric pressure, e.g. at about 5 to about 500 psia, e.g., at about 10 to about 50 psia, i.e. near or slightly above atmospheric pressure.

The gas mixture directed over the catalyst should contain at least a stoichiometric amount of oxygen as indicated by equations (1) and (2) above. Excess levels of oxygen above the stoichiometric amount may be desirable. In the method of this invention, a source of oxygen, such as air, is co-fed into the catalytic stage along with the exhaust gas. If sufficient oxygen is not present in the exhaust gas, a source of oxygen, e.g. air, may be added to the exhaust gas, and if sufficient oxygen is present in the exhaust gas, no air need be added to the exhaust gas.

Adequate conversion may be readily achieved with a simple stationary fixed-bed of catalyst. However, other contacting means are also contemplated, such as contacting with a fluid bed, a transport bed, and a monolithic catalyst structure such as a honeycomb.

Suitable mixing may be used before the catalytic stage of this invention to produce a homogeneous gas mixture for reaction in that stage. The mixers may be any suitable arrangement, including, for example, baffles, discs, ceramic discs, static mixers or combinations of these. The mixing may also be integral with the gas flow paths as described above.

Catalyst Composition

Catalysts useful in this invention typically comprise an active material and a support or binder. The support for the catalysts of this invention may be the same as the active material and further can be a synthetic or naturally occurring substance as well as an inorganic material such as clay, silica and/or one or more metal oxides. The latter may be either naturally occurring or in the form of gelatinous precipitates or gels including mixtures of silica and metal oxides. Naturally occurring clays which can be used as support for the catalysts include those of the montmorillonite and kaolin families, which families include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification. In addition to the foregoing materials, the catalysts of this invention may be supported on a porous binder or matrix material, such as alumina, titania, zirconia, silica-alumina, silica-magnesia, silica-zirconia, silica-thoria, silica-berylia, silica-titania, titania-zirconia, as well as ternary compounds such as silica-alumina-thoria, silica-alumina-zirconia, silica-alumina-magnesia, and silica-magnesia-zirconia. A mixture of these components could also be used. The support may be in the form of a cogel. One binder that is suitable is a low acidity titania prepared from a mixture comprising a low acidity titanium oxide binder material and an aqueous slurry of titanium oxide hydrate. Typical aluminas useful as supports in this invention include alpha ($\alpha$) alumina, beta ($\beta$) alumina, gamma ($\gamma$) alumina, chi-eta-rho (X,$\eta$,$\rho$) alumina, delta ($\delta$) alumina, theta ($\theta$) alumina, and lanthanum beta ($\beta$) alumina, with gamma alumina particularly preferred. The preferred support is one that is a high surface area material that also possesses a high temperature stability and further possesses a high oxidation stability.

The binder may be prepared according to application U.S. Ser. No. 08/112,501, incorporated by reference herein, or may be prepared according to methods disclosed in U.S. Pat. Nos. 4,631,267; 4,631,268; 4,637,995; and 4,657,880, each incorporated by reference herein. Also, the catalysts described herein may be combined with any of the binder precursors described in the above application and patents, and then may be formed, such as by extrusion, into the shape desired, and then hydrothermally treated and/or calcined as hereinafter described. The preferred binder is substantially free of alumina. By the term "substantially free of alumina" is meant that no alumina is intentionally added to the binder, however, it is recognized that trace amounts of alumina may be present.

When low acidity titania is used as a binder, it is desirable that the formable, e.g., extrudable, mass prepared by combining the zeolite, the iron salt, and the titania binder precursors contain at least about 0.5 wt. %, typically from about 1 wt. % to about 20 wt. %, specifically from about 2 to about 8 wt. % of the aqueous slurry of titanium oxide hydrate.

The low acidity titania is typically added in dry particulate form, e.g., titanium oxide hydrate, so as to control the moisture content of the binder/dispersant mixture at a level to promote satisfactory forming, e.g., extrusion.

The catalysts may also contain stabilizers such as alkaline earth oxides, phosphates and combinations thereof.

Catalysts of this invention are frequently used with a substrate. A material can be both substrate and part of the catalyst. Suitable substrate materials include cordierite, nitrides, carbides, borides, intermetallics, mullite, alumina, natural and synthetic zeolites, lithium aluminosilicate, titania, feldspars, quartz, fused or amorphous silica, clays, aluminates, zirconia, spinels, or metal monoliths of aluminum-containing ferrite type stainless steel, or austenite type stainless steel, and combinations thereof. Typical substrates are disclosed in U.S. Pat. Nos. 4,127,691 and 3,885,977, incorporated by reference herein. The catalyst is combined with the substrate in any method that ensures that the catalyst will remain intact during the catalytic reaction. For example, the catalyst may be present as a coating on the substrate, or it can be present as an integral part of the substrate. Additionally, as mentioned earlier, the substrate and at least part of the catalyst may be the same. For example, in some embodiments, zeolites may be used as both catalysts and substrates. When the catalyst of this invention is deposited on the substrate, it is typically done using a wash coat. The wash coat may be prepared, for example, by adding silica sol and water to the catalyst powder, mulling the mixture to form a thixotropic slurry, dipping the monolithic substrate into the slurry, and then drying and calcining the resulting structure. Alternatively, the catalyst may be formed and extruded together with the substrate and thus may become an integral part of the substrate.

The form and the particle size of the catalysts are not critical to the present invention and may vary depending, for example, on the type of reaction system employed. Non-limiting examples of the shapes of the catalyst for use in the present invention include balls, pebbles, spheres, extrudates, channeled monoliths, honeycombed monoliths, microspheres, pellets or structural shapes, such as lobes, pills, cakes, honeycombs, powders, granules, and the like, formed using conventional methods, such as extrusion or spray drying. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized bed systems, it is preferred that the major amount by weight of the particles have a diameter in the range of about 10 microns to about 250 microns, more preferably about 20 microns to about 150 microns.

The gas mixture, as described above, is contacted with a catalyst comprising a crystalline zeolite molecular sieve catalyst having the properties described below. Crystalline zeolites are a known type of porous crystalline siliceous solid, and are described in Breck, "Zeolite Molecular Sieves," John Wiley and Sons, N.Y., N.Y. (1974), the entire content of which is incorporated herein by reference for background purposes.

The catalyst useful in this invention will now be described in detail. It comprises an intermediate pore size zeolite (e.g., less than about 7 Angstroms pore size, such as from about 5 to less than about 7 Angstroms) having a silica to alumina molar ratio of at least about 5, specifically at least about 20, more specifically between about 40 and about 1000, most specifically about 50 to about 500, a Constraint Index of about 1 to about 12, said zeolite having been contacted with a water soluble iron salt or salt precursor in a fashion effective to maximize iron distribution on and inside the zeolite. The Constraint Index qualifies it as having an intermediate pore size, as will be more fully described below. Examples of such zeolites include ZSM-5 (U.S. Pat. No. 3,702,886 and Re. 29,948); ZSM-11 (U.S. Pat. No. 3,709,979); ZSM-12 (U.S. Pat. No. 3,832,449); ZSM-21 (U.S. Pat. No. 4,046,859); ZSM-22 (U.S. Pat. No. 4,556,477); ZSM-23 (U.S. Pat. No. 4,076,842); ZSM-35 (U.S. Pat. No. 4,016,245); ZSM-38 (U.S. Pat. No. 4,406,859); ZSM-48 (U.S. Pat. No. 4,397,827); ZSM-57 (U.S. Pat. No. 4,046,685); and ZSM-58 (U.S. Pat. No. 4,417,780). The entire contents of the above references are incorporated by reference herein.

The intermediate pore size zeolites are members of a novel class of zeolites that exhibit unusual properties. Although these zeolites have unusually low alumina contents, i.e. high silica to alumina ratios, they are active for converting organic compounds. The activity is surprising since catalytic activity is generally attributed to framework aluminum atoms and/or cations associated with these aluminum atoms. These zeolites have an intracrystalline sorption capacity for normal hexane which is greater than that for water, i.e. they exhibit "hydrophobic" properties.

The silica to alumina molar ratio referred to may be determined by conventional analysis. This ratio is meant to represent, as closely as possible, the ratio in the rigid anionic framework of the zeolite crystal and to exclude aluminum in the binder or in cationic or other form within the channels.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure typically have a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

In W. M. Meier and D. H. Olson, "Atlas of Zeolite Structure Types," 138–139, Butterworth-Heineman, Boston, Mass., (3rd ed. 1992), and in Roland von Ballmoos and John B. Higgins, "Collection of Simulated XRD Powder Patterns for Zeolites," 10 Zeolites, 313S, at 442S-445S, and at 504S, Butterworth-Heineman, Boston, Mass. (2d ed. 1990), incorporated by reference herein, ZSM-5 and similar zeolites have been identified as having a framework topology that is identified as MFI. Also included in the second of the above references is the X-ray diffraction pattern for ZSM-5.

The intermediate pore size zeolites referred to herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not an intermediate pore size material. Windows of 10-membered rings are preferred, although in some instances excessive puckering of the rings or pore blockage may render these zeolites ineffective.

Rather than attempt to judge from crystal structure whether or not a zeolite possesses the necessary constrained access to molecules larger than normal paraffins, a simple determination of the Constraint Index may be made. The method by which Constraint Index is determined is described fully in U.S. Pat. No. 4,016,218, incorporated herein by reference for details of the method. Constraint Index (CI) values for some typical zeolites including some which are suitable as catalysts in the process of this invention are as follows:

|  | CI (at test temperature) | |
| --- | --- | --- |
| ZSM-4 | 0.5 | (316° C.) |
| ZSM-5 | 6–8.3 | (371° C.–316° C.) |
| ZSM-11 | 5–8.7 | (371° C.–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-48 | 3.5 | (538° C.) |
| ZSM-50 | 2.1 | (427° C.) |
| MCM-22 | 0.6–1.5 | (399° C.–454° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6–2.0 | (316° C.–399° C.) |

The above-described Constraint Index is a desirable characteristic of those zeolites which are useful in the process of the present invention. The very nature of this parameter and the above-referenced procedure by which it is determined, however, admits of the possibility that a given zeolite can be tested under somewhat different conditions and thereby exhibit different Constraint Indices. Constraint Index appears to vary somewhat with the severity of the conversion operation and the presence or absence of support material. Similarly, other variables such as crystal size of the zeolite, the presence of occluded contaminants, etc., may affect the observed Constraint Index value. It will therefore be appreciated that it may be possible to select test conditions, e.g., temperature, as to establish more than one value for the Constraint Index of a particular zeolite. This explains the range of Constraint Indices for some zeolites, such as ZSM-5, ZSM-11, MCM-22, and Beta.

The catalyst may include a support and may be used with a substrate. In accordance with one embodiment, the catalyst may be brought into contact with a monolithic ceramic substrate by crystallizing the zeolite on the surface of the substrate, as disclosed in U.S. Pat. No. 4,800,187, incorporated herein by reference. The catalyst may also be formed into the substrate, such as by extrusion.

A catalyst useful in the method of this invention is prepared by combining a zeolite, such as HZSM-5, an iron salt, a high molecular weight, hydroxy functional silicone, such as Dow Corning Q6-2230 silicone resin, a suitable extrusion aid, such as methyl cellulose, and a suitable polar, water soluble carrier, such as methanol, ethanol, isopropyl alcohol, N-methyl pyrrolidone or a dibasic ester along with water as needed, then forming the mixture into the desired shape, such as by extrusion, then simultaneously calcining and hydrothermally treating the formed material. One particular methyl cellulose that is effective as an extrusion aid in the method of this invention is a hydroxypropyl methyl cellulose, such as K75M Methocel™, available from Dow Chemical Co. Dibasic esters that are useful in this invention include dimethyl glutarate, dimethyl succinate, dimethyl adipate, and mixtures thereof, one example of which is DuPont Chemical Co. DBE, which typically comprises about 50 to 75 percent dimethyl glutarate, 10 to 25 percent dimethyl adipate, 19 to 26 percent dimethyl succinate and less than about 0.2 wt. % methanol. Other silicone resins that may be used in the method of this invention include those described in U.S. Pat. No. 3,090,691.

The relative proportions of zeolite component and the support material on an anhydrous basis may vary widely with the zeolite content ranging from between about 5 to about 99 percent by weight and more usually in the range of about 10 to about 95 percent by weight, specifically from about 20 to about 90 percent by weight of the dry composite.

Original ions, e.g., alkali or alkaline earth metal, of the as-synthesized intermediate pore size material and any found in the zeolite/support material can be replaced in accordance with techniques well known in the art, at least in part, by ion-exchange with other ions. For the present catalyst composition, preferred replacing ions include hydrogen ions and hydrogen precursor, e.g., ammonium ions. ZSM-5 in the hydrogen exchanged form is referred to herein as HZSM-5. Typical ion-exchange techniques would be to contact the synthetic intermediate pore size zeolite or zeolite/support material with a solution containing a salt of the desired replacing ion or ions. Examples of such salts include the halides, e.g., chlorides, nitrates and sulfates. Representative ion-exchange techniques are disclosed in a wide variety of patents including U.S. Pat. Nos. 3,140,249; 3,140,251; and 3,140,253, incorporated by reference herein.

The desired iron loading on the zeolite component of the catalyst is about 0.01 to about 5 wt. %, typically at least about 0.4 wt. %, specifically at least about 0.6 wt. %, more specifically at least about 1 wt. %, most specifically at least about 1.5 wt. %, preferably about 2 wt. %, iron into the zeolite. The catalyst may also optionally include another metal, such as a transition metal, preferably a noble metal, the combination of the metals which is able to oxidize other undesirable compounds present in the exhaust gas along with allowing the SCR of $NO_x$. The metal may be at least one of copper, zinc, vanadium, chromium, manganese, cobalt, nickel, palladium, platinum, molybdenum, tungsten, sodium, potassium, magnesium, calcium, barium, cerium and mixtures thereof, with the noble metals, platinum, palladium and with combinations of these, along with cerium, particularly preferred. The term "metal" as used herein is intended to include the elemental metal as well as metal oxides, metal sulfides, and other metal containing compounds.

After the intermediate pore size zeolites have been contacted with the iron salt or salt precursor, they may be washed with water and dried at a temperature ranging from about 65° C. to about 315° C. and thereafter calcined or thermally treated in air, or in an inert gas, at temperatures ranging from about 260° C. to about 925° C. for periods of time ranging from about 1 to about 48 hours or more, typically at about 538° C. for about 4 to about 6 hours. While subatmospheric or superatmospheric pressure can be employed for the thermal treatment, atmospheric pressure is preferred simply for reasons of convenience. Catalysts of improved selectivity and other beneficial properties can be obtained by subjecting the iron contacted zeolite to at least one treatment with streams containing steam (hydrothermally treating the catalysts) at elevated temperatures ranging from about 260° C. to about 900° C., specifically from about 400° C. to about 850° C., more specifically from about 500° C. to about 700° C. The hydrothermal treatment may be accomplished in an atmosphere containing at least 20 ppm, 0.5%, 5, 10%, 20%, even up to 99% steam in air or some other suitable gas stream or in an atmosphere consisting of steam or nitrogen and some other gas which is essentially inert to the zeolite. Optionally, more than one hydrothermal treatment may be used, specifically two, three, or more hydrothermal treatments at different temperatures, e.g., increasing temperatures, may be used. Typical steaming conditions are described in U.S. Pat. Nos. 4,429,176; 4,522,929; 4,594,146; and 4,663,492; each incorporated by reference herein. The calcination and hydrothermal treatments of the catalysts are preferably combined into one treatment step and conducted simultaneously.

Iron salts suitable for use in this invention include the water soluble salts, such as, ferrous ammonium sulfate, ferrous chloride, ferrous fluosilicate, ferrous hyposulfite, ferrous iodide, ferrous lactate, ferrous nitrate, ferrous perchlorate, ferrous sulfate, and ferrous thiocyanate. Other suitable iron salts include ferric acetate, iron(III) benzoate, iron(III) cacodylate, iron(III) dichromate, iron(III) citrate, iron(III) fluoride, iron(III) fluosilicate, iron(III) formate, iron(III) glycerophosphate, iron(III) hydrogen cyanide, iron(III) hydrosulfate, iron(III) lactate, iron(III) malate, iron(III) oxalate, iron(III) orthophosphate, iron(III) hypophosphite, iron(III) sulfide, iron(III) thiocyanate, ferric acetylacetonate, ferric ammoniumchloride, ferric chloride, iron(III) nitrate nanohydrate, iron(III) sulfate pentahydrate, ammonium ferric sulfate, ferric bromide, ferric iodide, and any other ferrous, ferric, or other iron salts that are water soluble. Also included are precursors of all of the salts mentioned above.

The incorporation of iron onto the zeolite may be accomplished by contacting an intermediate pore size zeolite with an iron salt or salt precursor, such as those mentioned above. In this method, the iron salt may first be dissolved in water or another suitable carrier or solvent and then the zeolite may be contacted with the solution, recovered from the solution, dried and then bound if desired. Alternatively, the iron salt and the zeolite, and any binder material desired, may be physically combined with water or another suitable carrier or solvent to produce a mixture and the mixture recovered and formed, such as by extrusion. The formed material may be dried, calcined, or hydrothermally treated as is more fully described herein. As will be apparent to one skilled in the art, any method that is effective to contact the zeolite with the iron salt and to achieve a high degree of iron distribution on and inside the zeolite may be used, including, but not limited to mulling or an incipient wetness technique.

As noted above, the catalytic reduction of nitrogen oxides is substantially effected by the use of the present process. By substantially effected is meant a conversion of greater than about 40, 80, 85, 90, 95, or even 99% or more of the nitrogen oxides and the ammonia in the exhaust gas to innocuous compounds, such as nitrogen, through the use of this process. This is also referred to herein as conversion of a substantial portion of the $NO_x$ and ammonia in the exhaust gas to innocuous compounds.

The catalysts of this invention will now be illustrated by examples. The examples are for illustrative purposes only and are not to be construed as limiting the scope of the invention, which scope is defined by this entire specification including the appended claims.

An unmodified, untreated hydrogen form ZSM-5 catalyst was used as the base catalyst for all of the following examples and was also used as the reference catalyst for comparison examples, where appropriate.

EXAMPLE 1

Catalytic evaluation of base unimpregnated HZSM-5

In this example, the SCR activity of the base ZSM-5 catalyst is evaluated. The catalyst sample was evaluated using a fixed bed quartz reactor operating between 250°–550° C. The gas feed contained 500 ppm NO, 500 ppm $NH_3$, and 5% $O_2$ in a He carrier flowing at a constant gas hourly space velocity (GHSV) of 12,000 $hr^{-1}$. The gas effluent from the reactor was continuously monitored by non-dispersive infrared spectroscopy (NDIR) detectors. Catalyst activity results are reported below in Table 1.

TABLE 1

| | Percent N in Feed Converted to $N_2$ |
|---|---|
| Temperature, °C. | Base Catalyst |
| 550 | 89% |
| 455 | 100% |
| 400 | 100% |
| 345 | 71% |
| 250 | 26% |

EXAMPLE 2

Preparation of an iron containing ZSM-5

An iron containing ZSM-5 sample was prepared by the following method: 100 g of distilled water was heated to about 85° C. with constant stirring under a blanket of dry nitrogen. Approximately 0.11 g of ferrous sulfate and 5.1 g of the base HZSM-5 were added to the heated water. A solution pH of about 2 was maintained by dropwise addition of nitric acid or ammonium hydroxide, as needed. The solution was maintained at about 85° C. under a nitrogen blanket with continued stirring for approximately 17 hours. The solution was subsequently cooled to room temperature, filtered and washed with distilled water. The filtered solid was calcined in air for 8 hours at 538° C. to produce the iron containing catalyst, Catalyst A. The iron loading of this catalyst as prepared is about 0.5 wt. %.

EXAMPLE 3

Comparative testing against the base ZSM-5

In this example, the SCR activity of Catalyst A is compared with the base HZSM-5 catalyst. The catalyst sample was evaluated using a fixed bed quartz reactor operating between 250°–550° C. The gas feed contained 500 ppm NO, 500 ppm $NH_3$, and 5% $O_2$ in a He carrier flowing at a constant gas hourly space velocity (GHSV) of 12,000 $hr^{-1}$. The gas effluent from the reactor was continuously monitored by non-dispersive infrared spectroscopy (NDIR) detectors. Catalyst activity results are reported below in Table 2.

TABLE 2

| | Percent N in Feed Converted to $N_2$ | |
|---|---|---|
| Temperature, °C. | Base ZSM-5 Catalyst | Catalyst A |
| 550 | 89% | 93% |
| 455 | 100% | 98% |
| 400 | 100% | 98% |
| 345 | 71% | 97% |
| 250 | 26% | 92% |

EXAMPLE 4

Preparation of an Iron Containing ZSM-5

An iron containing ZSM-5 sample was prepared by the following method: a solution containing 25 g of the base HZSM-5 and 500 g of distilled water was heated to about 77° C. with constant stirring under a blanket of dry argon. Approximately 0.3 g of ammonium ferrous sulfate was added to the heated solution. A solution pH of 3 was maintained by dropwise addition of nitric acid or ammonium hydroxide, as needed. The solution was maintained at about 77° C. under an argon blanket with continuous stirring for approximately 9 hours. The solution was subsequently cooled to room temperature, filtered and washed with distilled water. The filtered solid was calcined in air for 8 hours at 538° C. to produce the iron containing catalyst, Catalyst B. The iron loading of this catalyst as prepared is about 0.5 wt. %.

EXAMPLE 5

Comparative testing against a base ZSM-5

In this example, the SCR activity of Catalyst B is compared with the base HZSM-5 catalyst. The catalyst samples were evaluated using similar equipment and the same procedure as Example 3. Catalyst activity results are reported below in Table 3.

TABLE 3

| | Percent N in Feed Converted to $N_2$ | |
|---|---|---|
| Temperature, °C. | Base ZSM-5 Catalyst | Catalyst B |
| 550 | 89% | 100% |
| 455 | 100% | 100% |
| 400 | 100% | 100% |
| 345 | 71% | 100% |
| 250 | 26% | 90% |

EXAMPLE 6

Preparation of an iron containing ZSM-5

An iron containing ZSM-5 catalyst was prepared by the following method: about 20 g of ammonium iron(III) sulfate was dissolved in 74 g distilled water. This solution was added to about 120 g of the base HZSM-5 and the slurry was mixed at about room temperature and was then dried at about 100° C. overnight. Approximately 10 g of the dried, impregnated solid was then calcined in air at about 600° C. with about 10% steam for about 10 hours to produce the desired iron containing catalyst, Catalyst C. The iron loading of this catalyst is about 2 wt. %.

EXAMPLE 7

Catalytic evaluation of Catalyst C

In this example, the SCR activity of Catalyst C from Example 6 was evaluated using similar equipment and the same procedure as Example 3. Catalyst activity results are reported below in Table 4.

TABLE 4

| Percent N in Feed Converted to $N_2$ | |
|---|---|
| Temperature, °C. | Catalyst C |
| 550 | 76% |
| 455 | 95% |
| 400 | 99% |
| 345 | 98% |
| 250 | 90% |

EXAMPLE 8

Preparation of an iron containing ZSM-5

An iron containing ZSM-5 catalyst was prepared by the following method: about 1.5 g of iron(III) nitrate was dissolved in 6.5 g distilled water. This solution was added to about 10 g of the base HZSM-5 and the slurry was mixed at about room temperature and was then dried at about 100° C. overnight. The dried, impregnated solid was then calcined in air at about 600° C. with about 10% steam for about 10 hours to produce the desired iron containing catalyst, Catalyst D. The iron loading of this catalyst is about 2 wt. %.

EXAMPLE 9

Catalytic evaluation of Catalyst D

In this example, the SCR activity of Catalyst D from Example 8 was evaluated using similar equipment and the same procedure as Example 3. Catalyst activity results are reported below in Table 5.

TABLE 5

| Percent N in Feed Converted to $N_2$ | |
|---|---|
| Temperature, °C. | Catalyst D |
| 550 | 86% |
| 455 | 97% |
| 400 | 99% |
| 345 | 99% |
| 250 | 92% |

EXAMPLE 10

Preparation of a silica bound-iron containing ZSM-5

A silica bound iron containing ZSM-5 catalyst was prepared by the following method: about 100 g of the dried, iron impregnated HZSM-5 catalyst prepared in Example 6 was dry blended with about 22 g of Dow Corning silicone resin (Q6-2230) and about 6.8 g of K75M Methocel™ (available from Dow Chemical Co.). Approximately 89 ml of a 1:1 by volume mixture of water:isopropyl alcohol was then added to the dry blended powder. The slurry was mulled for a minimum of 5 minutes until the mixture reached the proper consistency for extrusion. The mixture was then extruded into 1/16 inch diameter cylindrical strands in a screw extruder and was allowed to dry. Approximately 10 g of the dried extrudate was calcined in air at 600° C. with 10% steam for 10 hours to produce the desired iron containing catalyst, Catalyst E. The iron loading of this catalyst is about 2 wt. %.

EXAMPLE 11

Catalytic evaluation of Catalyst E

In this example, the SCR activity of Catalyst E from Example 10 was evaluated using similar equipment and the same procedure as Example 3. Catalyst activity results are reported below in Table 6.

TABLE 6

| Percent N in Feed Converted to $N_2$ | |
|---|---|
| Temperature, °C. | Catalyst E |
| 550 | 74% |
| 455 | 97% |
| 400 | 100% |
| 345 | 99% |
| 250 | 88% |

EXAMPLE 12

Comparative testing after steaming

In this example, the SCR activity of the base HZSM-5 and Catalysts C, D, and E are compared after each of the catalyst were treated with 100% steam at 700° C. for 7 hours. The catalyst samples were evaluated using similar equipment and the same procedure as Example 3. Catalyst activity results are reported below in Table 7.

TABLE 7

| | Percent N in Feed Converted to $N_2$ Steamed Catalysts | | | |
|---|---|---|---|---|
| Temp., °C. | Base Catalyst | Catalyst C | Catalyst D | Catalyst E |
| 550 | 56% | 92% | 99% | 92% |
| 455 | 46% | 100% | 96% | 100% |
| 400 | 36% | 100% | 95% | 100% |
| 345 | 20% | 100% | 93% | 100% |
| 250 | 6% | 96% | 82% | 95% |

EXAMPLE 13

An iron containing ZSM-5 catalyst was prepared by the following method: Approximately 1.5 g of iron (III) nitrate was dissolved in 6.5 g distilled water. This solution was added to about 10 g of the base HZSM-5 and the resulting slurry was mixed and dried at room temperature overnight. The dried impregnated solid was then calcined in air at 600° C. with 10% steam for 10 hours to produce the desired catalyst, Catalyst F. The nominal iron loading of this sample is about 2 wt %.

EXAMPLE 14

In this example, the SCR activity of Catalyst F from Example 13 was evaluated using similar equipment and the same reaction conditions as Example 3. See Table 8 below.

TABLE 8

Percent N in Feed Converted to $N_2$

| Temperature, °C. | Catalyst F |
|---|---|
| 550 | 86% |
| 455 | 97% |
| 400 | 99% |
| 345 | 99% |
| 250 | 92% |

EXAMPLE 15

In this example Catalyst F was hydrothermally treated at 850° C. in air containing 20% steam for 6 hours. This catalyst is referred to as Catalyst G.

EXAMPLE 16

In this example, the SCR activity of the hydrothermally treated catalyst, Catalyst G, from Example 15 was evaluated using similar equipment and the same reaction conditions as Example 3. Catalyst activity results are reported below in Table 9.

TABLE 9

Percent N in Feed Converted to $N_2$

| Temperature, °C. | Hydrothermally treated Catalyst F |
|---|---|
| 550 | 96% |
| 455 | 99% |
| 400 | 99% |
| 345 | 99% |
| 250 | 96% |

EXAMPLE 17

In this example the hydrothermally treated catalyst, Catalyst G, from Example 14 was aged at 700° C. in 100% steam for 7 hours. This catalyst is referred to as Catalyst H.

EXAMPLE 18

In this example, the SCR activity of the aged, hydrothermally treated catalyst, Catalyst H, from Example 17 was evaluated using similar equipment and the same reaction conditions as Example 3. Catalyst activity results are reported below in Table 10.

TABLE 10

Percent N in Feed Converted to $N_2$

| Temperature, °C. | Aged Catalyst of Example 17 |
|---|---|
| 550 | 99% |
| 455 | 96% |
| 400 | 95% |
| 345 | 93% |
| 250 | 82% |

EXAMPLE 19

In this example the aged, hydrothermally treated catalyst, Catalyst H, from Example 17 was further aged at 900° C. in 100% steam for 7 hours. This catalyst is referred to as Catalyst I.

EXAMPLE 20

In this example, the SCR activity of the aged, hydrothermally treated catalyst, Catalyst I, from Example 19 was evaluated using similar equipment and the same reaction conditions as Example 3. Catalyst activity results are reported below in Table 11.

TABLE 11

Percent N in Feed Converted to $N_2$

| Temperature, °C. | Aged Catalyst of Example 19 |
|---|---|
| 550 | 86% |
| 455 | 71% |
| 400 | 53% |
| 345 | 28% |
| 250 | 11% |

EXAMPLE 21

In this example Catalyst F was aged at 700° C. in 100% steam for 7 hours without the intermediate hydrothermal treatment. This catalyst will be referred to as Catalyst J.

EXAMPLE 22

In this example, the SCR activity of the aged catalyst, Catalyst J from Example 21 was evaluated using similar equipment and the same reaction conditions as Example 3. Catalyst activity results are reported below in Table 12.

TABLE 12

Percent N in Feed Converted to $N_2$

| Temperature, °C. | Aged Catalyst of Example 21 |
|---|---|
| 550 | 98% |
| 455 | 98% |
| 400 | 97% |
| 345 | 99% |
| 250 | 77% |

EXAMPLE 23

In this example the aged catalyst, Catalyst J, from Example 21 was further aged at 900° C. in 100% steam for 7 hours. This catalyst will be referred to as Catalyst K.

EXAMPLE 24

In this example, the SCR activity of the twice-aged catalyst, Catalyst K, from Example 23 was evaluated using similar equipment and the same reaction conditions as Example 3. Catalyst activity results are reported below in Table 13.

TABLE 13

Percent N in Feed Converted to $N_2$

| Temperature, °C. | Aged Catalyst of Example 23 |
|---|---|
| 550 | 56% |
| 455 | 32% |
| 400 | 21% |
| 345 | 14% |
| 250 | 8% |

What we claim is:

1. A method for treating a gas mixture comprising $NO_x$ and ammonia, said method comprising directing the gas mixture along with a source of oxygen over a catalyst under treating conditions effective for the selective catalytic reduction of $NO_x$; said catalyst comprising an intermediate pore size zeolite powder which has been contacted with a water soluble iron salt or salt precursor under contacting conditions effective to produce an iron loading on the zeolite component of the catalyst of at least about 0.4 wt. %; said catalyst having been composited and integrally formed with a binder comprising at least one selected from the group consisting of titania, zirconia, and silica; said method further comprising simultaneously calcining and hydrothermally treating said catalyst at a temperature of from about 400° C. to about 850° C. under conditions effective to produce a catalyst that is capable of conversion of greater than about 80 percent of the $NO_x$ and ammonia to innocuous compounds when the catalyst has been aged using 100 percent steam at 700° C. for 7 hours, prior to directing said gas mixture over said catalyst.

2. The method according to claim 1 wherein the silica:alumina molar ratio of the intermediate pore size zeolite is between about 20 and about 1000.

3. The method according to claim 1 wherein the iron loading of the zeolite component of the catalyst is at least about 1.5 wt. %.

4. The method according to claim 3 wherein the iron loading of the zeolite component of the catalyst is less than about 5 wt. %.

5. The method according to claim 1 wherein the intermediate pore size zeolite is selected from the group consisting of ZSM-5, ZSM-11, ZSM-12, ZSM-21, ZSM-22, ZSM-23, ZSM-35, ZSM-38, ZSM-48, ZSM-57, and ZSM-58.

6. The method according to claim 5 wherein the intermediate pore size zeolite comprises ZSM-5.

7. The method according to claim 1 wherein the treating conditions comprise a temperature of about 200° C. to about 1,000° C., a pressure of about 5 to about 500 psia, and a gas hourly space velocity (GHSV) of about 1,000 to about 500,000 $hr^{-1}$.

8. The method according to claim 7, wherein the conditions for treating the gas mixture comprise a temperature of about 200° C. to about 455° C.

9. The method according to claim 1, wherein the conditions for treating the gas mixture comprise a temperature between 250° C. and 550° C. and wherein the hydrothermal treatment is conducted under conditions effective to produce a catalyst that is capable of conversion of greater than 8 percent of the $NO_x$ and ammonia to innocuous compounds when the catalyst has been aged using 100 percent steam at 700° C. for 7 hours and then has been further aged using 100 percent steam at 900° C. for 7 hours.

10. The method according to claim 1 wherein the source of oxygen comprises air.

11. The method according to claim 1 wherein the catalyst has a shape selected from the group consisting of balls, pebbles, spheres, extrudates, channeled monoliths, honeycomb monoliths, microspheres, pellets, lobes, pills, cakes, powders, granules, and combinations thereof.

12. The method according to claim 1 wherein the catalyst further comprises at least one metal selected from the group consisting of platinum, palladium, nickel, copper, chromium, manganese, tungsten, molybdenum, sodium, potassium, magnesium, calcium, barium, cerium, and mixtures thereof.

13. The method according to claim 1 wherein the binder is substantially free of alumina.

14. A method for treating a gas mixture comprising $NO_x$ and ammonia, said method comprising directing the gas mixture along with a source of oxygen over a catalyst composition under treating conditions effective for the selective catalytic reduction of $NO_x$; said catalyst composition having been prepared by combining into one formable mass:

(a) an intermediate pore size zeolite powder having a silica:alumina molar ratio of between about 20 and about 1000;

(b) a water soluble iron salt in a quantity sufficient to provide an iron loading of at least about 1.0 wt. % of the zeolite component of the catalyst composition;

(c) silicone resin;

(d) methyl cellulose; and (e) at least one carrier selected from the group consisting of methanol, ethanol, isopropyl alcohol, N-methyl pyrrolidone, dibasic ester, water and mixtures thereof;

said catalyst composition further having been formed into a desired shape, method further comprising simultaneously calcining and hydrothermally treating said catalyst at a temperature of from about 400° C. to about 850° C. after being formed, the hydrothermal treatment being conducted under conditions effective to produce a catalyst that is capable of conversion of greater than about 80 percent of the $NO_x$ and ammonia to innocuous compounds when the catalyst has been aged using 100 percent steam at 700° C. for 7 hours, prior to directing said gas mixture over said catalyst.

15. The method according to claim 14 wherein the silica:alumina molar ratio of the intermediate pore size zeolite is between about 40 and about 500.

16. The method according to claim 14 wherein the iron loading of the zeolite component of the catalyst is at least about 1.5 wt. %.

17. The method according to claim 14 wherein the iron loading of the zeolite component of the catalyst is less than about about 5 wt. %.

18. The method according to claim 14 wherein the intermediate pore size zeolite is selected from the group consisting of ZSM-5, ZSM-11, ZSM-12, ZSM-21, ZSM-22, ZSM-23, ZSM-35, ZSM-38, ZSM-48, ZSM-57, and ZSM-58.

19. The method according to claim 18 wherein the intermediate pore size zeolite comprises ZSM-5.

20. The method according to claim 14 wherein the water soluble iron salt is at least one selected from the group consisting of ferrous ammonium sulfate, ferrous chloride, ferrous fluosilicate, ferrous hyposulfite, ferrous iodide, ferrous lactate, ferrous nitrate, ferrous perchlorate, ferrous sulfate, ferrous thiocyanate, ferric acetate, iron(III) benzoate, iron(III) cacodylate, iron(III) dichromate, iron(III) citrate, iron(III) fluoride, iron(III) fluosilicate, iron(III) formate, iron(III) glycerophosphate, iron(III) hydrogen cyanide, iron(III) hydrosulfate, iron(III) lactate, iron(III) malate, iron(III) oxalate, iron(III) orthophosphate, iron(III) hypophosphite, iron(III) sulfide, iron(III) thiocyanate, ferric acetylacetonate, ferric ammoniumchloride, ferric chloride, iron(III) nitrate nanohydrate, iron(III) sulfate pentahydrate, ammonium ferric sulfate, ferric bromide, ferric iodide and mixtures thereof.

\* \* \* \* \*